(12) United States Patent
Taylor et al.

(10) Patent No.: US 8,851,526 B2
(45) Date of Patent: Oct. 7, 2014

(54) CAP FOR A QUICK CONNECT FITTING ASSEMBLY AND METHOD OF ASSEMBLY USING SAME

(75) Inventors: Steven Craig Taylor, West Bloomfield, MI (US); Angela C. Dewhurst, Royal Oak, MI (US); Gregory T. Graham, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 224 days.

(21) Appl. No.: 13/348,118

(22) Filed: Jan. 11, 2012

(65) Prior Publication Data

US 2013/0175795 A1    Jul. 11, 2013

(51) Int. Cl.
 *F16L 37/00*    (2006.01)
(52) U.S. Cl.
 USPC ............................................. 285/305; 285/93
(58) Field of Classification Search
 USPC ................... 285/190, 305, 93, 321, 901, 325; 29/407.1
 See application file for complete search history.

(56) References Cited

U.S. PATENT DOCUMENTS

| | | | | |
|---|---|---|---|---|
| 4,640,534 A | * | 2/1987 | Hoskins et al. | 285/305 |
| 4,707,000 A | * | 11/1987 | Torgardh | 285/305 |
| 4,844,515 A | * | 7/1989 | Field | 285/305 |
| 4,884,829 A | * | 12/1989 | Funk et al. | 285/305 |
| 5,046,765 A | * | 9/1991 | Usui | 285/305 |
| 5,468,024 A | * | 11/1995 | Carman et al. | 285/305 |
| 5,628,531 A | * | 5/1997 | Rosenberg et al. | 285/320 |
| 5,749,606 A | * | 5/1998 | Lu et al. | 285/305 |
| 6,382,343 B1 | * | 5/2002 | Engler | 285/305 |
| 6,601,878 B2 | * | 8/2003 | Ooi et al. | 285/93 |
| 6,860,515 B2 | * | 3/2005 | Inoue | 285/93 |
| 7,104,571 B2 | * | 9/2006 | Inoue et al. | 285/93 |
| 7,401,820 B2 | * | 7/2008 | Niki | 285/305 |
| 7,481,463 B2 | * | 1/2009 | Ishida et al. | 285/305 |
| 7,874,595 B2 | * | 1/2011 | Lechner et al. | 285/305 |
| 8,141,914 B2 | * | 3/2012 | Haltmayer et al. | 285/305 |
| 8,146,956 B2 | * | 4/2012 | Chaupin | 285/305 |
| 8,205,912 B2 | * | 6/2012 | Takenaka et al. | 285/319 |
| 8,398,121 B2 | * | 3/2013 | Lotti | 285/325 |
| 2002/0163183 A1 | * | 11/2002 | Ooi et al. | 285/93 |
| 2003/0094809 A1 | * | 5/2003 | Inoue | 285/93 |
| 2008/0007052 A1 | * | 1/2008 | Niki | 285/305 |
| 2008/0290654 A1 | * | 11/2008 | Sawada | 285/93 |
| 2011/0031743 A1 | * | 2/2011 | Chaupin | 285/305 |
| 2011/0291404 A1 | * | 12/2011 | Pernikl | 285/305 |

* cited by examiner

*Primary Examiner* — David E Bochna
(74) *Attorney, Agent, or Firm* — Quinn Law Group, PLLC

(57) ABSTRACT

A cap for a quick connect fitting assembly is a unitary component having a terminal portion and a body portion extending from the terminal portion to define an inner cavity. The body portion defines a first opening opposite the terminal portion and a second opening extending from the first opening toward the terminal portion. The terminal portion has a first locating feature and the body portion has a second locating feature. The first and the second locating features are spaced relative to one another such that the unitary component will connect to the quick connect fitting assembly with both of the locating features contacting predetermined locations of the quick connect fitting assembly only if a male fitting is inserted into a female fitting to a predetermined position, the unitary component thus ensuring proper connection of the quick connect fitting assembly. A method of assembly using the cap is provided.

7 Claims, 3 Drawing Sheets

CAP FOR A QUICK CONNECT FITTING ASSEMBLY AND METHOD OF ASSEMBLY USING SAME

TECHNICAL FIELD

The present teachings generally include a cap for a quick connect fitting and a method of assembly using the cap.

BACKGROUND

Quick connect fitting assemblies allow components to be connected without the use of fasteners. Quick connect fitting assemblies have a male fitting that connects to a female fitting. Once connected, fluids or electric wiring can pass from one component to another component through the connected male and female fittings. For example, quick connect fittings have been used to connect automotive fuel lines. Assembly procedures typically require an operator or robotic mechanism assembling the male fitting to the female fitting to conduct a "pull check" by pulling on the fittings once assembled to ensure that they do not easily come apart, thus ensuring that the male fitting is sufficiently connected to the female fitting.

SUMMARY

A cap for a quick connect fitting assembly has locating features that ensure that a male fitting is properly connected to a female fitting. The cap is configured for a male fitting that defines a first angled interior passage and is configured to be inserted into a female fitting that has a second interior passage so that the first angled interior passage is continuous with the second interior passage. The cap is a unitary component having a terminal portion and a body portion extending from the terminal portion to define an inner cavity. The body portion defines a first opening opposite the terminal portion and a second opening extending from the first opening toward the terminal portion. The terminal portion has a first locating feature and the body portion has a second locating feature. The first locating feature and the second locating feature are spaced relative to one another such that the unitary component will connect to the quick connect fitting assembly with both of the locating features contacting predetermined locations of the quick connect fitting assembly only if the male fitting is inserted into the female fitting to a predetermined position, the unitary component thus ensuring proper connection of the quick connect fitting assembly.

A method of assembly includes inserting a male fitting into a female fitting so that the outlet of the male fitting opens into an interior passage of the female fitting. The male fitting has an inlet positioned at an angle to the outlet. A unitary cap is then placed over the male fitting with the inlet extending out of a window in the cap and the female fitting extending through another opening in the cap. The method includes ensuring that the male fitting is sufficiently inserted into the female fitting to a predetermined position by verifying that a first locating feature of the cap contacts the male fitting and a second locating feature of the cap fits to the female fitting.

The above features and advantages and other features and advantages of the present teachings are readily apparent from the following detailed description of the best modes for carrying out the present teachings when taken in connection with the accompanying drawings.

DETAILED DESCRIPTION

Figure 1:
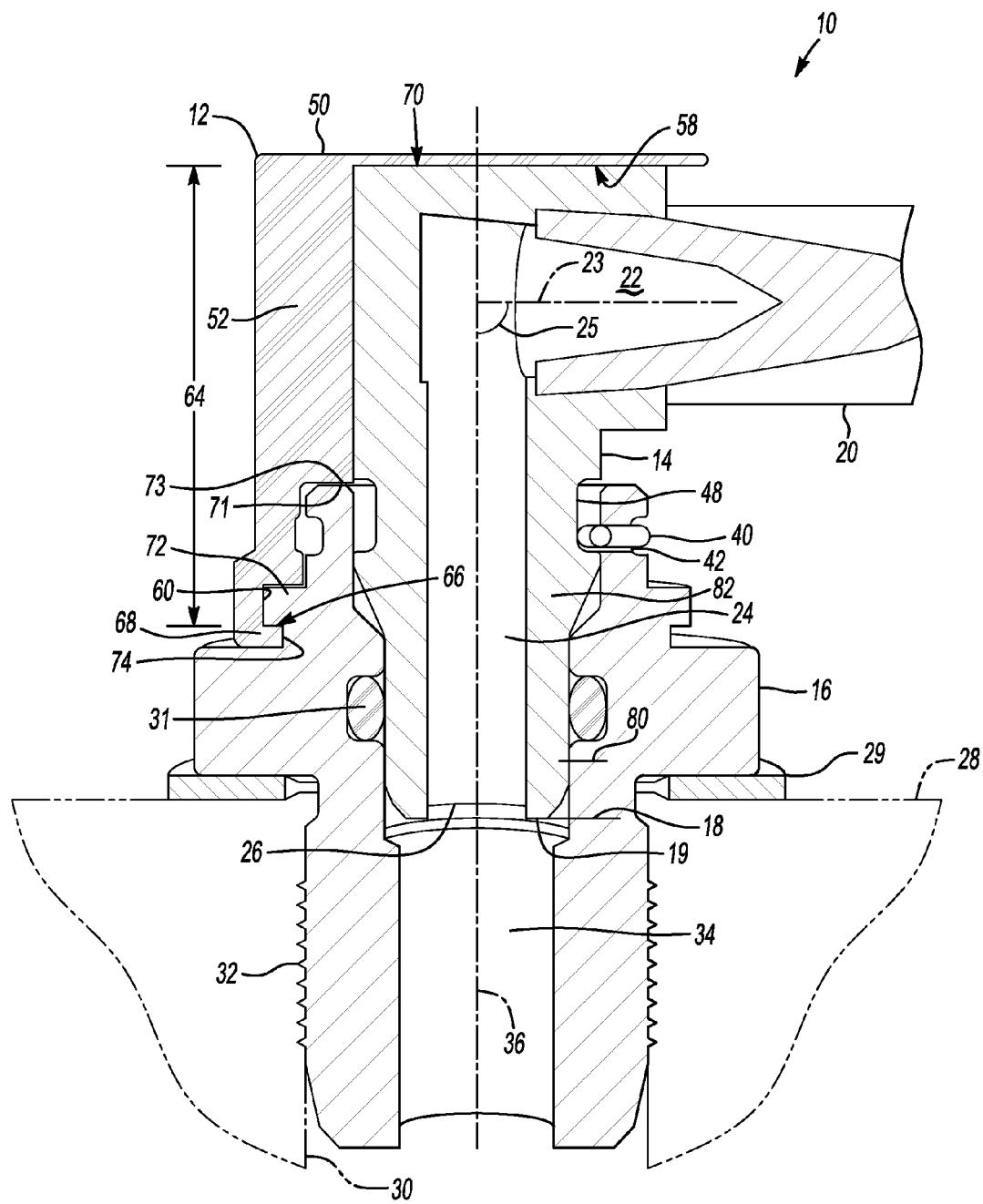
FIG. 1 is a schematic cross-sectional illustration of an assembly taken at the lines 1-1 in FIG. 2, including a quick connect fitting assembly and a cap that ensures proper connection of a male fitting to a female fitting, and showing the assembly mounted to a second component that is shown in phantom.
Figure 2:
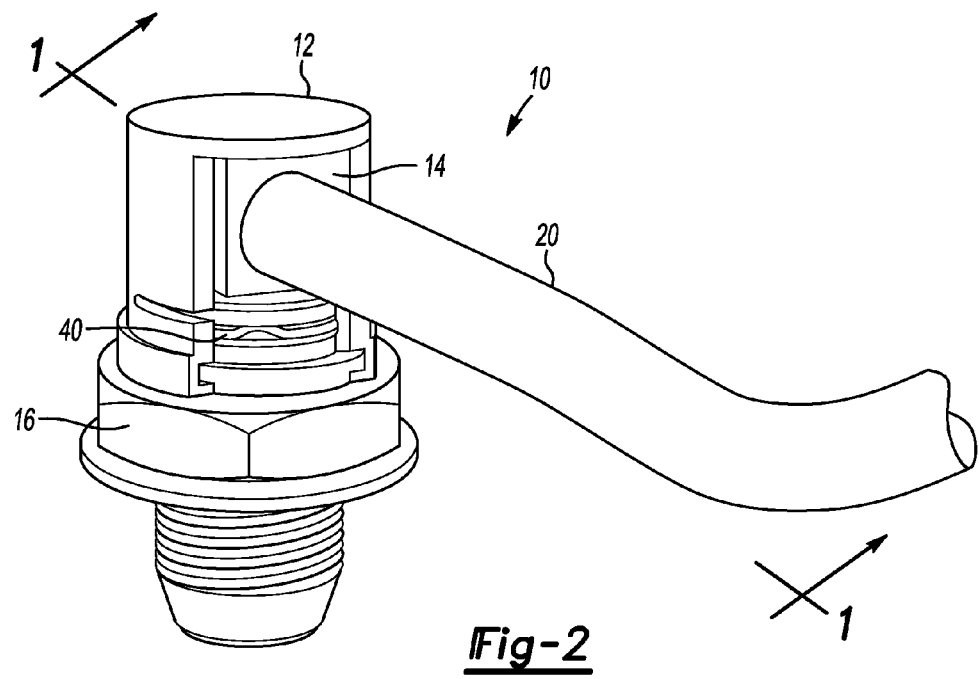
FIG. 2 is a schematic perspective illustration in partially fragmentary view of the assembly of FIG. 1.

Referring to the drawings, wherein like reference numbers refer to like components throughout the several views, FIG. 1 is an illustration of a quick connect fitting assembly 10 that has a cap 12 that assures proper connection of a male fitting 14 to a female fitting 16 as explained herein. Specifically, the cap 12 is configured to connect to the male fitting 14 and the female fitting 16 only if the male fitting 14 is inserted into the female fitting 16 to a predetermined position 18, illustrated with a distal end 19 of the male fitting 14 at the predetermined position 18 within the female fitting 16.

The male fitting 14 receives or is formed integrally with an elongated conduit 20. The male fitting 14 has a first angled interior passage 22, 24 formed by a first passage portion 22 arranged substantially perpendicular to a second passage portion 24. An outlet 26 of the second passage portion 24 is at ninety degree angle 25 to the first passage portion 22. Stated differently, a center axis 23 of the first passage portion 22 is at a ninety degree angle to a center axis 36 of the second passage portion 24. The male fitting 14 is referred to as a ninety degree fitting due to this angled interior passage 22, 24. Such a male fitting 14 can be useful for applications requiring tight packaging and a change in direction of a connection between a first component and a second component. The first passage portion 22 may be at different angles to the second passage portion 24 in other embodiments. In the embodiment shown, the male fitting 14 and female fitting 16 connect the conduit 20, and a second component. In this application, the second component may be a cylinder block 28 with an internally threaded opening 30 to which an externally threaded portion 32 of the female fitting 16 is threaded, with the female fitting 16 mounted to the cylinder block 28 at a washer 29. A seal 31 may be used to help prevent leakage between the male fitting 14 and the female fitting 16.

Fluid flow from the conduit 20 to the cylinder block 28 through the quick connect fitting assembly 10 is enabled with the male fitting 14 maintaining a relatively low profile to the cylinder block 28. In other embodiments, the male fitting 14 may enable fluid flow between other components, or may provide a passage for electric wiring to connect a first and a second component through the interior passages 22, 24 of the male fitting and a second interior passage 34 of the female fitting 16. The second interior passage 34 also shares the center axis 36 commonly with the second passage portion 24 when the male fitting 14 is inserted into the female fitting 16.

Figure 4:
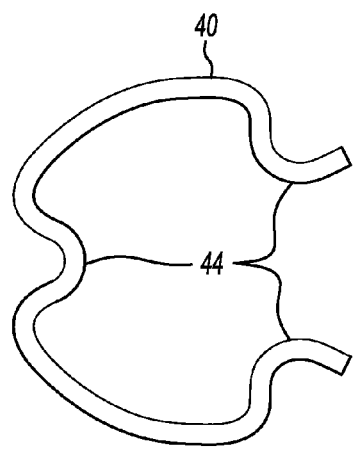
FIG. 4 is a schematic illustration in plan view of a retaining clip used in the assembly of FIG. 1.
Figure 5:
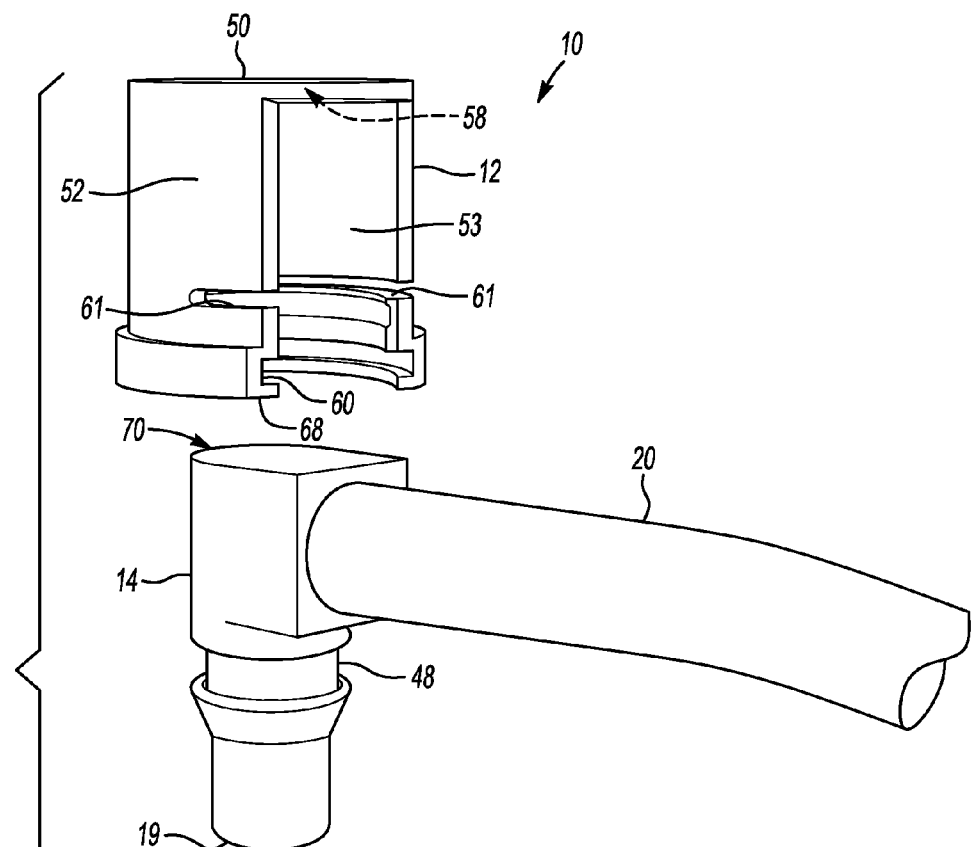
FIG. 5 is a schematic illustration in exploded view of the assembly of FIG. 1.
Figure 5:
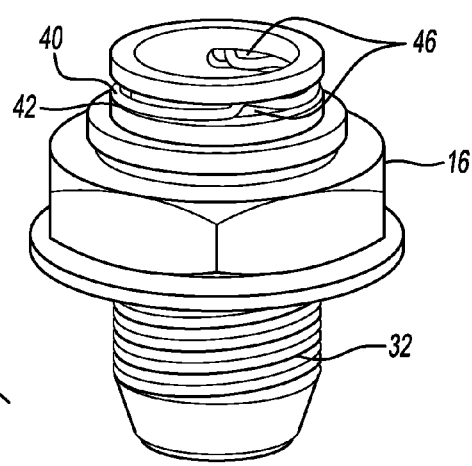

A retaining clip 40 is used in the quick connect fitting assembly 10. The retaining clip 40 may be an irregularly-shaped clip as shown in FIG. 4 that is commonly referred to as an E clip. The retaining clip 40 rests in an annular exterior channel 42 of the female fitting 16, referred to herein as a second annular exterior channel. The retaining clip 40 has spaced inwardly-extending portions 44 that fit into spaced apertures 46 of the female fitting 16 at the channel 42 as best shown in FIG. 5. Two of the apertures 46 are visible in FIG. 5. In other embodiments, fewer or more apertures 46 and inwardly-extending portions 44 may be used.

The inwardly extending portions 44 extend into an exterior annular channel 48 of the male fitting 14 when the male fitting 14 is inserted to the predetermined position 18, with the exterior channels 42, 48 aligned, as shown in FIG. 1. The retaining clip 40 snaps into the exterior channel 48 when the male fitting 14 is inserted into the female fitting 16 to the predetermined position 18. The retaining clip 40 retains the male fitting 14 to the female fitting 16 when the fittings are assembled and limits movement of the male fitting 14 relative to the female fitting 16 along the center axis 36.

If the male fitting 14 is not inserted far enough into the female fitting 16 (i.e., so that the distal end 19 is not at the predetermined position 18), the retaining clip 40 cannot snap into the channel 48. The cap 12 is used to ensure that the male fitting 14 is properly assembled to the female fitting 16 so that the retaining clip 40 will snap into the exterior annular channel 48. Specifically, the cap 12 has locating features that prevent the cap 12 from connecting to the assembled male fitting 14 and female fitting 16 if the male fitting 14 is not inserted to the predetermined position 18.

Figure 3:
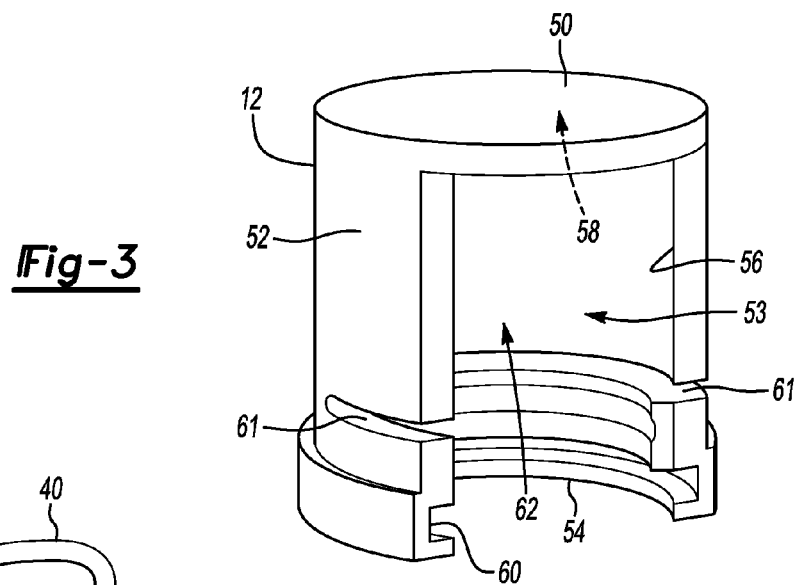
FIG. 3 is a schematic perspective illustration of the cap of the assembly of FIG. 1.

As shown in FIG. 3, the cap 12 is a unitary component that has a terminal portion 50 and a body portion 52 extending from the terminal portion 50. In the embodiment shown, the terminal portion 50 is an upper wall of the cap 12, and the body portion 52 is a generally cylindrical extension. Together, the terminal portion 50 and the body portion 52 define an inner cavity 53. The body portion 52 has an opening 54 opposite the terminal portion 50, referred to as a first opening. The body portion 52 also defines a second opening 56 extending upward from the first opening 54 toward the terminal portion 50. The second opening 56 may be referred to as a window. The second opening 56 is in a plane generally perpendicular to a plane of the first opening 54.

The terminal portion 50 of the cap 12 has an inner surface 58 that faces the inner cavity 53. The body portion 52 of the cap 12 has a generally annular internal channel 60 that extends at least partially around an inner surface 62 of the body portion 52 and opens to the inner cavity 53. The inner surface 58 is spaced relative to the annular internal channel 60 so that the inner surface 58 serves as a first locating feature and the annular internal channel 60 serves as a second locating feature to ensure proper connection of the male fitting 14 to the female fitting 16 when the cap 12 is connected to the fittings 14, 16. As best illustrated in FIG. 1, the inner surface 58 is spaced a distance 64 along the axis 36 from an upper surface 66 of an inwardly-extending flange 68 of the cap 12 that partially defines the annular internal channel 60. Because the cap 12 is a unitary component, the relative spacing of the inner surface 58 and the channel 60 is constant. Although the cap 12 may be flexed to connect to the fittings 14, 16, it returns to the original unflexed dimensions when the flexing force is removed.

When the cap 12 is placed on the assembled male fitting 14 and female fitting 16, it is placed over the male fitting 14 with the conduit 20 extending through the second opening 56 and the first opening 54 substantially surrounding the male fitting 14. The cap 12 is lowered until the inner surface 58 of the terminal portion 50 contacts an exterior surface 70 of the male fitting 14. This locates the first locating feature (the inner surface 58) relative to the male fitting 14. A surface 71 of the body portion 52 of the cap 12 also contacts the end 73 of the female fitting 16 if the male fitting 14 is properly inserted in the female fitting 16.

The cap 12 is then flexed so that the inwardly-extending flange 68 fits over an external, outwardly-extending flange 72 of the female fitting 16 and into an external channel 74 of the female fitting 16. This places the outwardly-extending flange 72 of the female fitting 16 into the annular internal channel 60 of the body portion 52. As shown in FIGS. 3 and 5, the cap 12 has cuts 61 extending from the second opening 56 partially around the body portion 52. The cuts 61 allow greater flexing of the cap 12 as needed to fit the inwardly-extending flange 68 over the flange 72 so that the flange 72 is received in the channel 60. The cap 12 may be a flexible plastic material. If the plastic material has great enough flexibility, the cuts 61 may not be necessary.

Because the first locating feature, the inner surface 58, is located relative to the male fitting 14 by contacting the exterior surface 70, and the second locating feature, the annular internal channel 60, is located to the female fitting at the external channel 74 and flange 72, the cap 12 will not be able to be properly located on the assembled male fitting 14 and female fitting 16 unless the male fitting 14 is properly inserted to the predetermined position 18 within the female fitting 16. The exterior surface 70 and the channel 74 are predetermined locations on the assembled fittings which the locating features 58, 60 must contact to ensure proper assembly. For example, if the male fitting 14 is positioned so that the distal end 19 is only at the position 80 within the female fitting 16, indicated in FIG. 1, then the inwardly-extending flange 68 will be far above the outwardly-extending flange 72 of the female fitting 16, and the outwardly-extending flange 72 will not be able to be seated in the annular channel 60. In the embodiment shown, the male fitting 14 flares outward at a midportion 82 to prevent the male fitting 14 from being inserted too far into the female fitting 16. In an embodiment in which the male fitting 14 does not have such a self-limiting feature, the cap 12 would still assure proper connection of the male fitting 14 to the female fitting 16. In that case, if the male fitting 14 is inserted too far into the female fitting 16, although the outwardly-extending flange 72 would fit into the annular internal channel 60, the inner surface 58 would not contact the outer surface 70 of the male fitting 14.

Figure 6:
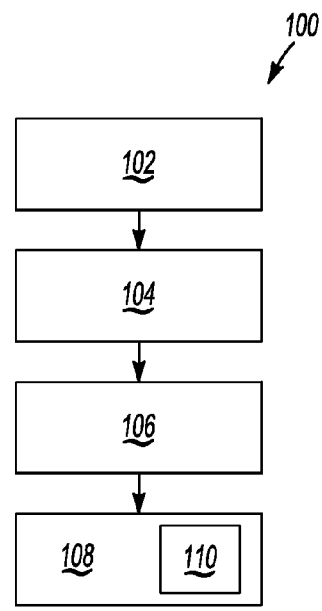
FIG. 6 is a flow diagram of a method of assembly used with the assembly of FIG. 1.

Referring to FIG. 6, a flow diagram illustrates a method of assembly 100 that ensures that the quick connect fitting assembly 10 is assembled as intended, with a male fitting 14 sufficiently inserted into a female fitting 16. Specifically, the method 100 includes step 102, installing a male fitting 14 with an angular interior passage 22, 24 to an elongated conduit 20 so that an outlet 26 of the male fitting 14 is at an angle to the elongated conduit 20. The method 100 includes step 104, in which a retaining clip 40 is placed around an annular exterior channel 42 of the female fitting 16. Next, in step 106, the male fitting 14 is inserted into the female fitting 16. To ensure a proper connection of the male fitting 14 to the female fitting 16, in step 108, a unitary cap 12 is placed over the male fitting 14 with the elongated conduit 20 extending out of the second opening 56 and the male fitting 14 and female fitting 16 extending through the first opening 54 in the cap 12. The method 100 then includes step 110, ensuring that the male fitting 14 is inserted into the female fitting 16 to a predetermined position 18 by verifying that a first locating feature of the cap 12, i.e., the inner surface 58, contacts the external surface 70 of the male fitting 14, and a second locating feature of the cap 12, i.e., the inner annular channel 60, fits to the outwardly-extending flange 72 of the female fitting 16. If the male fitting 14 and female fitting 16 are not properly aligned, the cap 12 will not contact the male fitting 14 as desired. That is, the inner surface 58 and/or the annular internal channel 60 will not properly contact the fittings 14, 16. The cap 12 can be manually connected or connected by a robotic assembly. If manually connected, the assembly line operator will determine that the connection of the male fitting 14 to the female fitting 16 is not as intended if the locating features of the cap 12 cannot be positioned as required by the method 100. If the cap 12 is robotically positioned on the assembled fittings 14, 16, sensors can be used to determine the proper positioning of the cap 12, as will be readily understood by those skilled in the art.

Use of the cap 12 described and the method 100 will ensure that improperly assembled quick connector assemblies are readily determined and can be reassembled with the angled male connector positioned to an intended position.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. An assembly comprising:
    a male fitting that defines a first angled interior passage;
    a female fitting that has a second interior passage defining a center axis;
    wherein the male fitting is configured to connect to the female fitting by insertion into the second interior passage to a predetermined position along the center axis so that the first angled interior passage is continuous with the second interior passage;
    a unitary cap having a terminal portion and a body portion extending from the terminal portion to define an inner cavity; wherein the body portion defines a first opening opposite the terminal portion and a second opening extending from the first opening toward the terminal portion;
    wherein the terminal portion has an inner surface facing the inner cavity and the body portion has a channel substantially surrounding an inner surface of the body portion; and
    wherein the inner surface of the terminal portion and the channel of the body portion are spaced relative to one another such that the unitary cap will connect to the male fitting and the female fitting with the inner surface of the terminal portion contacting an outer surface of the male fitting and the channel contacting a flange of the female fitting only if the male fitting is inserted into the female fitting to the predetermined position, the unitary component thus ensuring proper connection of the male fitting and the female fitting;
    wherein the male fitting has a first annular exterior channel;
    wherein the female fitting has a second annular exterior channel and apertures that extend through the female fitting at the second annular exterior channel; and
    a retaining clip configured to fit in the second annular exterior channel and extend through the apertures into the first annular exterior channel to limit relative movement of the male fitting and the female fitting along the center axis.

2. The assembly of claim 1, wherein the first angled interior passage of the male fitting is substantially a 90 degree passage; and wherein the male fitting extends through the second opening when the cap is connected to the fittings.

3. The assembly of claim 2, in combination with a cylinder block for an engine; wherein the female fitting is threaded to fit to a threaded opening of the cylinder block, thereby enabling fluid flow at 90 degrees from the male fitting to the cylinder block.

4. The assembly of claim 1, wherein the cap has at least one cut extending from the second opening partially around the body portion and generally parallel with the first opening to allow flexing of the body portion at the cut when connecting the cap to the fittings.

5. A method of assembly comprising:
    placing a retaining clip around a female fitting;
    after said placing a retaining clip around the female fitting, inserting a male fitting into a female fitting so that an outlet of the male fitting opens into an interior passage of the female fitting; wherein the male fitting has an inlet positioned at an angle to the outlet;
    placing a unitary cap over the male fitting with the inlet extending toward a first opening in the cap and the female fitting extending through a second opening in the cap, with the first and second openings being positioned at an angle to one another; and
    ensuring that the male fitting is sufficiently inserted into the female fitting to a predetermined position by verifying that a first locating feature of the cap contacts the male fitting and a second locating feature of the cap fits to the female fitting.

6. The method of claim 5, wherein said ensuring includes flexing the body portion around an exterior flange of the female fitting.

7. The method of claim 5, further comprising:
    installing the male fitting to an elongated conduit so that the outlet of the male fitting is at an angle to the elongated conduit.

* * * * *